United States Patent
Feng et al.

(10) Patent No.: US 10,236,667 B2
(45) Date of Patent: Mar. 19, 2019

(54) WIRE FOLLOW-UP PROTECTION STRUCTURE OF ELECTRIC REDUCER

(71) Applicants: China National Offshore Oil Corporation, Beijing (CN); China Oilfield Services Limited, Hebei (CN)

(72) Inventors: Yongren Feng, Hebei (CN); Tiemin Liu, Hebei (CN); Zhibin Tian, Hebei (CN); Liping Liu, Hebei (CN); Xiaodong Chu, Hebei (CN); Zanqing Wei, Hebei (CN); Xingfang Wu, Hebei (CN); Guiqing Hao, Hebei (CN)

(73) Assignees: China National Offshore Oil Corporation, Beijing (CN); China Oilfield Services Limited, Hebei (CN)

( * ) Notice: Subject to any disclaimer, the term of this patent is extended or adjusted under 35 U.S.C. 154(b) by 9 days.

(21) Appl. No.: 15/561,101

(22) PCT Filed: Jul. 17, 2017

(86) PCT No.: PCT/CN2017/093109
§ 371 (c)(1),
(2) Date: Sep. 25, 2017

(87) PCT Pub. No.: WO2018/014804
PCT Pub. Date: Jan. 25, 2018

(65) Prior Publication Data
US 2018/0323589 A1    Nov. 8, 2018

(30) Foreign Application Priority Data

Jul. 21, 2016 (CN) .......................... 2016 1 0580205

(51) Int. Cl.
*H02G 3/04* (2006.01)
*E21B 25/00* (2006.01)
*E21B 17/02* (2006.01)

(52) U.S. Cl.
CPC ......... *H02G 3/0406* (2013.01); *E21B 17/026* (2013.01); *E21B 25/00* (2013.01);
(Continued)

(58) Field of Classification Search
CPC .. H02G 3/0406; H02G 3/0437; H02G 3/0462; E21B 17/026; E21B 25/10
(Continued)

(56) References Cited

U.S. PATENT DOCUMENTS

| 4,750,570 A | 6/1988 | Barrett |
| 8,153,898 B2 * | 4/2012 | Aoki ..................... H02G 11/00 174/68.3 |

(Continued)

FOREIGN PATENT DOCUMENTS

| CA | 2886323 A1 | 4/2014 |
| CN | 2704679 Y | 6/2005 |

(Continued)

OTHER PUBLICATIONS

PCT search report of Application No. PCT/CN2017/093109, dated Jul. 17, 2017.

*Primary Examiner* — Dhiru R Patel
(74) *Attorney, Agent, or Firm* — Banner & Witcoff, Ltd.

(57) ABSTRACT

A wire follow-up protection structure of an electric reducer includes a deformation mechanism with a variable length and sliding plates, the sliding plates being symmetrically disposed on both sides of the deformation mechanism, the deformation mechanism being supported on the sliding plates, the sliding plates limiting the deformation mechanism such that the deformation mechanism deforms between the sliding plates, a continuous run-through channel being preset within the deformation mechanism, the deformation mechanism being disposed to be rotationally connected to the electric reducer and slidably connected to a main body
(Continued)

of a coring device, the channel being disposed as a passage for wire.

5 Claims, 2 Drawing Sheets

(52) U.S. Cl.
CPC ............. *H02G 3/04* (2013.01); *H02G 3/0437* (2013.01); *H02G 3/0462* (2013.01)

(58) Field of Classification Search
USPC ....................................................... 174/74 R
See application file for complete search history.

(56) References Cited

U.S. PATENT DOCUMENTS

| | | | | |
|---|---|---|---|---|
| 8,802,986 | B2 * | 8/2014 | Satou | B60R 16/0207 |
| | | | | 174/68.1 |
| 9,976,361 | B2 * | 5/2018 | Richards | E21B 17/026 |
| 10,012,033 | B2 * | 7/2018 | Schultz | E21B 17/026 |
| 10,101,599 | B1 * | 10/2018 | Greeson | G02C 13/006 |

FOREIGN PATENT DOCUMENTS

| | | |
|---|---|---|
| CN | 101037941 A | 9/2007 |
| CN | 202596725 U | 12/2012 |
| CN | 203239261 U | 10/2013 |
| CN | 104153772 | 11/2014 |
| CN | 105672924 A | 6/2016 |
| CN | 106223885 A | 12/2016 |

* cited by examiner

WIRE FOLLOW-UP PROTECTION STRUCTURE OF ELECTRIC REDUCER

TECHNICAL FIELD

The present application relates to, but is not limited to, the petroleum mining technology field and, particularly to a wire follow-up protection structure of an electric reducer in a coring device in the petroleum mining technology field.

BACKGROUND OF THE RELATED ART

A drilling-type sidewall coring device is a kind of petroleum exploration equipment. The driving mechanism of the drill bit in the existing drilling-type sidewall coring device is a hydraulic motor driven by high pressure produced by a hydraulic system, the hydraulic motor drives a diamond drill bit to make it screw into the stratum, and after drilling to a target length, a rock core of the stratum is obtained by a core folding action. The drill bit of the above-mentioned coring device is installed on the hydraulic motor, and the power transmission route of driving the drill bit is: the electric motor→the hydraulic pump→the hydraulic motor→the drill bit. The power transmission efficiency of the hydraulic pump and the hydraulic motor is very low, especially when the temperature changes greatly, the viscosity of hydraulic oil changes greatly, and the efficiency is lower. Therefore the effective power transmitted from the electric motor to the drill bit is very small, about 20%. In order to ensure that the drill bit has enough power to complete the coring operation, the power of the electric motor must be large, while the requirement of large power of the electric motor would give rise to great difficulty in downhole power supply and high risk. In addition, the viscosity of hydraulic oil is greatly affected by temperature, and the power transmission efficiency of the hydraulic system is closely related to the viscosity, so the instrument operation temperature range of the same hydraulic oil is relatively narrow, different hydraulic oil must be frequently replaced based on different downhole operation temperatures to complete the coring operation.

CONTENT OF THE INVENTION

In order to improve the drilling efficiency, there has been a drill bit drive mode of directly driving a drill bit by integrating an electric motor and a reducer. This drilling drive mode can greatly improve the effective power transmitted from the electric motor to the drill bit. But, the electric reducer integrated by an electric motor and a reducer could move with the drilling, flip and swing of the drill bit due to direct connection with the drill bit, the wire of the electric reducer is bare and also moves with the electric reducer. The movement of the wire may cause occurrence of winding, flexing, wear and leakage so as to affect the life of the wire.

Based on this, the present application provides a wire follow-up protection structure of the electric reducer to prevent the wire from easily flexing, winding, being damaged during the movement of the electric reducer and to provide a balance lubrication passage of the electric reducer.

A wire follow-up protection structure of an electric reducer, comprising a deformation mechanism with a variable length and sliding plates, the sliding plates being symmetrically disposed on both sides of the deformation mechanism, the deformation mechanism being supported on the sliding plates, the sliding plates limiting the deformation mechanism such that the deformation mechanism deforms between the sliding plates, a continuous run-through channel being preset within the deformation mechanism, the deformation mechanism being disposed to be rotationally connected to the electric reducer and slidably connected to a main body of a coring device, the channel being set as a passage for wire.

Alternatively, the deformation mechanism comprises a long rotary joint, a medium rotary joint and a short rotary joint that are rotationally connected in turn, the medium rotary joint and the short rotary joint are slidably connected to the sliding plates at the same time.

Alternatively, a first sliding path and a second sliding path staggered in upper and lower layers are provided within the sliding plate, the medium rotary joint slides along the first sliding path and the short rotary joint slides along the second sliding path.

Alternatively, the deformation mechanism is disposed to be slidably connected to the main body of the coring device via a sliding connection tube, an end portion of the sliding connection tube is disposed with a stop ring for restricting disengagement of the sliding connection tube.

Alternatively, the long rotary joint and the medium rotary joint are connected via a long straight connection tube, the long straight connection tube being in plug connection with the medium rotary joint.

Alternatively, the long straight connection tube is in plug connection with the medium rotary joint via a male joint and a female joint.

Alternatively, the channel is also disposed as a passage for hydraulic oil.

Alternatively, the material of the deformation mechanism is an anti-corrosion metal resistant to high temperature.

The above scheme may have the following beneficial effects:

First, the deformation mechanism formed from the long rotary joint, the medium rotary joint and the short rotary joint converts the flexible wire to be basically rigid (by protection of a rigid deformation mechanism), preventing the wire from flexing and winding during movement with the electric reducer, and meanwhile, the wire is located within the deformation mechanism, avoiding the occurrence of the exposed wire being scratched, thereby extending the life of the wire.

Next, the deformation mechanism is supported on symmetrically disposed sliding plates, and the sliding plates limit the deformation mechanism such that the deformation mechanism deforms between the sliding plates, which may avoid the lateral deformation of the deformation mechanism and the wire located therein.

Further, the run-through channel within the deformation mechanism can fix the wire of the electric reducer and lead the hydraulic oil of the main body to the casing of the electric reducer, which may balance the internal and external pressures of the coring device while lubricating the electric reducer, thus ensuring normal operation of the coring device in the high temperature and high pressure environment.

In addition, the long straight connection tube connected to the long rotary joint is in plug connection with the medium rotary joint, the plug connection mode facilitates assembling and disassembling as well as maintenance of the coring device.

The above is an overview of the subject matter described in detail herein. This overview is not intended to limit the protection scope of the claims.

Other aspects may be understood upon reading and understanding the brief description of drawings and the embodiments of the invention.

BRIEF DESCRIPTION OF DRAWINGS

When it is considered in combination with the drawings, the embodiments of the present application will be more fully, better understood and many accompanying advantages herein will be readily conceived with reference to the following detailed depictions, but the drawings illustrated herein are provided to further understand the embodiments of the present application and constitute part of the embodiments of the present application, and the illustrative embodiments of the present application and the explanation thereof are intended to explain the present application but not constitute a limitation to the present application, in which:

FIG. 5 is a schematic cross-sectional view of A-A in FIG. 1 when the electric reducer drives a drill bit to drill in;

FIG. 6 is a three-dimensional schematic view when the electric reducer drives a drill bit to drill in.

REFERENCE SIGNS

1—electric reducer, 2—outlet port, 3—long rotary joint, 4—long straight connection tube, 5—lock nut, 6—lock ring, 7—sealing ring, 8—3-core male joint, 9—3-core female joint, 10—electric motor wire, 11—sliding plate, 12—first sliding groove, 13—second sliding groove, 14—female adapter, 15—medium rotary joint, 16—short connector, 17—short rotary joint, 18—sliding connection tube, 19—stop ring, 20—main body, 21—hydraulic oil.

Embodiments of the Present Invention

Hereinafter, embodiments of the present application will be described in combination with the accompanying drawings, and it should be noted that embodiments in the present application and the features in the embodiments may be arbitrarily combined with each other without conflict.

Figure 1:
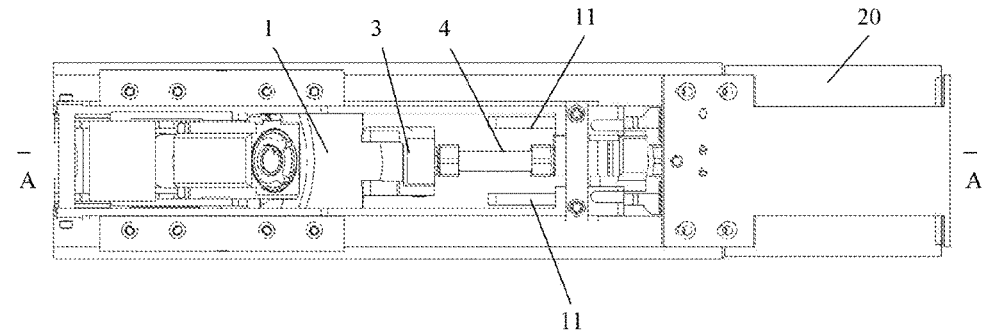
FIG. 1 is a schematic top view of the follow-up protection structure.
Figure 2:
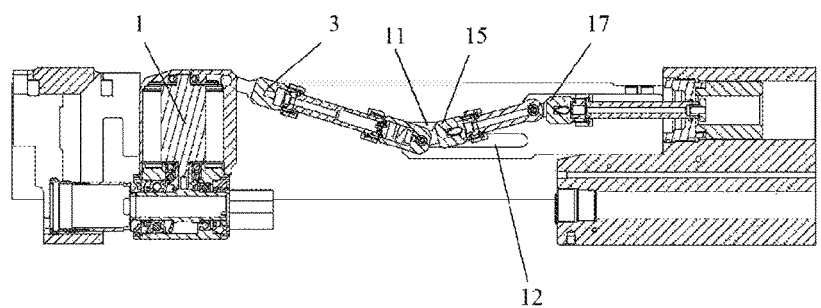
FIG. 2 is a schematic cross-sectional view of A-A in FIG. 1 when the electric reducer is in the initial position.
Figure 3:
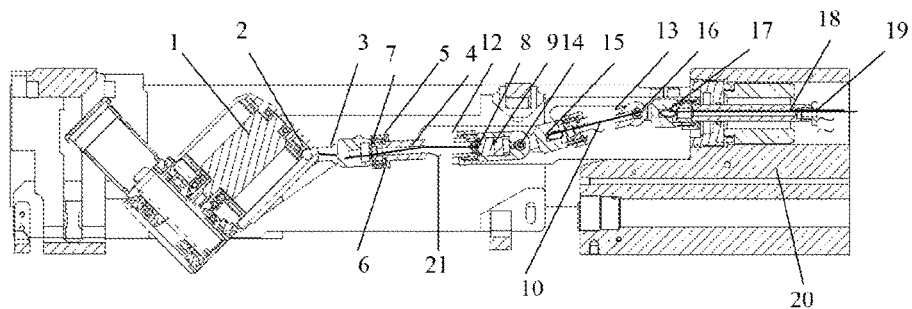
FIG. 3 is a schematic cross-sectional view of A-A in FIG. 1 when the electric reducer is flipped to be angled with the axis of the coring device.
Figure 4:
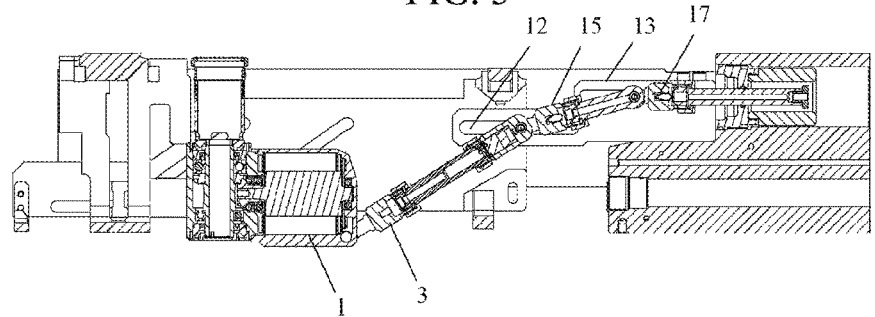
FIG. 4 is a schematic cross-sectional view of A-A in FIG. 1 when the electric reducer is flipped to a position perpendicular to the axis of the coring device.
Figure 5:
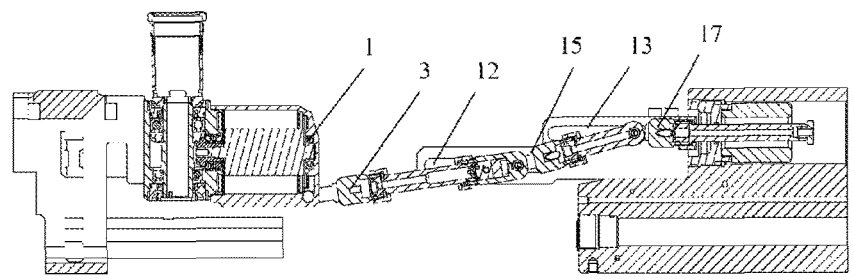
Figure 6:
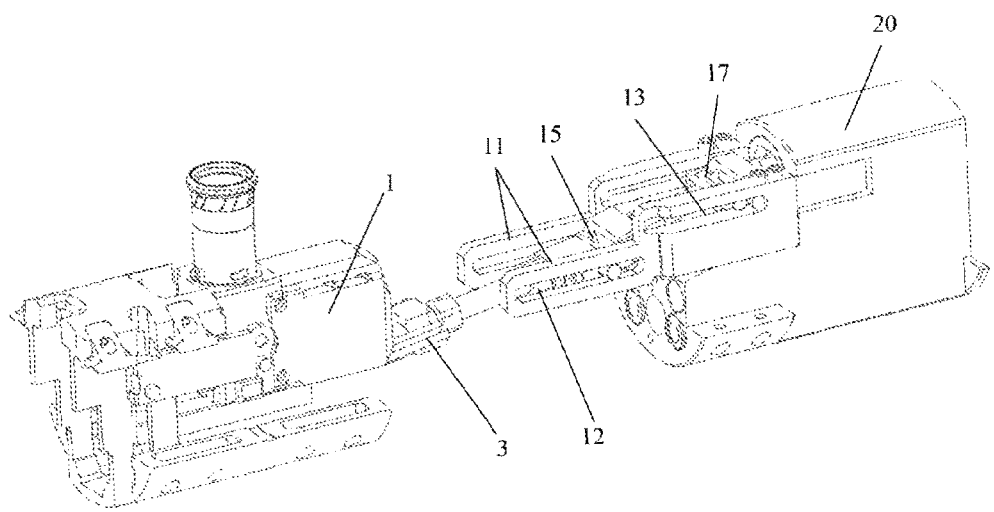

Please refer to FIGS. 1 to 6, wherein FIG. 1 is a schematic top view of the follow-up protection structure; FIG. 2 is a schematic cross-sectional view of A-A in FIG. 1 when the electric reducer is in the initial position; FIG. 3 is a schematic cross-sectional view of A-A in FIG. 1 when the electric reducer is flipped to be angled with the axis of the coring device; FIG. 4 is a schematic cross-sectional view of A-A in FIG. 1 when the electric reducer is flipped to a position perpendicular to the axis of the coring device; FIG. 5 is a schematic cross-sectional view of A-A in FIG. 1 when the electric reducer drives the drill bit to drill in; FIG. 6 is a three-dimensional schematic view when the electric reducer drives a drill bit to drill in.

The follow-up protection structure shown in FIGS. 1 to 6 includes a long rotary joint 3, a long straight connection tube 4, a medium rotary joint 15, a short connector 16, a short rotary joint 17 and a sliding connection tube 18, one end of the long rotary joint 3 is rotationally connected to the outlet port 2 of the electric reducer 1 and the other end is fixed to one end of the long straight connection tube 4 via the lock ring 6 and the lock nut 5, and the long rotary joint 3 and the long straight connection tube 4 are sealed by the sealing ring 7. The other end of the long straight connection tube 4 is rotationally connected to the medium rotary joint 15 via the female adapter 14, and the female adapter 14 is fixed to the long straight connection tube 4 via the lock nut, the medium rotary joint 15 is connected to the short rotary joint 17 via the short connector 16, the medium rotary joint 15 is fixedly connected to the short connector 16 via the lock nut, and the short connector 16 is rotationally connected to the short rotary joint 17. The short rotary joint 17 is connected to the sliding connection tube 18 which extends into the main body 20 and is slidably connected to the main body 20 through a shaft hole of an auxiliary mounting fixed to the main body 20, and in order to prevent the sliding connection tube 18 from disengaging from the main body 20 during the movement of the protection structure with the electric reducer, the end portion of the sliding connection tube 18 is connected with a stop ring 19 with a larger diameter than the shaft hole.

There are shafts on sides of the medium rotary joint 15 and the short rotary joint 17, the shafts are mounted on sliding plates 11 disposed on both sides of the deformation mechanism, wherein, the shaft of the medium rotary joint 15 is mounted within the first sliding groove 12 and the shaft of the short rotary joint 17 is mounted within the second sliding groove 13, and the first sliding groove 12 and the second sliding groove 13 are disposed in the upper and lower layers which are staggered, wherein the first sliding groove 12 is located at the lower layer and the second sliding groove 13 is located at the upper layer. The first sliding grooves 12 and the second sliding grooves 13 on the sliding plates restrict the deformation mechanism, so that the shafts of the medium rotary joint 15 and the shafts of the short rotary joint 17 can slide within the first sliding grooves 12 and the second sliding grooves 13, respectively, and the short rotary joint 17 is rotatable relative to the medium rotary joint 15 so that the short rotary joint 17 and the medium rotary joint 15 do not undergo lateral deformation.

Referring to FIG. 3, the long straight connection tube 4 is connected to the female adapter 14 via the pluggable 3-core male joint 8 and 3-core female joint 9, wherein the 3-core male joint 8 is connected to the end portion of the long straight connection tube 4, and the 3-core female joint 9 is connected to the female adapter 14, and the plug connection facilitates maintenance and assembly and disassembly of the coring device.

Referring to FIGS. 2 to 5, the long rotary joint 3, the long straight connection tube 4, the medium rotary joint 15, the short connector 16, the short rotary joint 17 and the sliding connection tube 18 are sequentially connected to form a deformation mechanism with a variable length, all of the above-mentioned members are preset with continuous and mutually run-through channels. The electric motor wire 10 is laid within the channels of the deformation mechanism after coming out of the outlet port 2 of the electric reducer 1. When the electric reducer 1 drives the drill bit to flip from the initial position (parallel to the axis of the coring device) to the coring position (a position perpendicular to the axis of the coring device), and then to drill in along the position perpendicular to the axis of the coring device for coring, the electric reducer 1 drives the drill bit to swing by a certain angle for core folding after coring, and with such a series of actions of the electric reducer 1, the electric motor wire 10 is fixed within the deformation mechanism and moves with the deformation mechanism. The mutually run-through channels from the electric reducer 1 to the main body 20 can ensure that the electric motor wire 10 will not wind and flex during the actions of the electric reducer 1 such as flip, drilling, swing, etc., and the mutually run-through channels connect the casing of the electric reducer 1 and the main body 20 at the same time, which can be used as a passage of the hydraulic oil 21, introducing the hydraulic oil with the main body 20 into the casing of the electric reducer 1 via the channels. The hydraulic oil 21 may play a role in lubricating the electric reducer 1, and meanwhile a run-through loop can reduce the pressure difference between the inside and outside of the coring device to play a role in protecting the coring device.

Alternatively, the material of the deformation mechanism is an anti-corrosion metal resistant to high temperature, for example, titanium alloy, stainless steel, etc.

The above-mentioned embodiments are merely examples for illustrating the present application, and the protection scope of the present application is not limited by them but is still subject to the content of claims of the present application. It is easily understood that, in other embodiments, those skilled in the art may make changes in accordance with conventional technical and general knowledge of the art, which all fall into the protection scope of the present application.

The depictions of exemplary embodiments of the present application have been completed herein. It may be appreciated by those skilled in the art that the embodiments described herein are merely used for illustrating the present application in which the elements or structures and the like of the wire follow-up protection structure of the electric reducer may be varied, and equivalent transformation and improvement on the basis of the technical scheme of the present application should not be excluded from the protection scope of the present application.

INDUSTRIAL APPLICABILITY

In the embodiments of the present application, flexible wire is converted to be basically rigid by the protection of a rigid deformation mechanism, preventing occurrence of flexing and winding of the wire during movement with the electric reducer and providing a balance lubrication passage of the electric reducer. The present application can be widely applied to a coring device in the field of petroleum mining technology.

What we claim is:

1. A wire follow-up protection structure of an electric reducer, comprising: a deformation mechanism of which a length is variable, and a pair of sliding plates, the pair of sliding plates being symmetrically disposed on both sides of the deformation mechanism, the deformation mechanism being supported on the pair of sliding plates, the pair of sliding plates limiting the deformation mechanism such that the deformation mechanism deforms between the pair of sliding plates, the deformation mechanism being disposed to be rotationally connected to the electric reducer and slidably connected to a main body of a coring device, wherein the deformation mechanism comprises a long rotary joint, a medium rotary joint and a short rotary joint that are rotationally connected in turn, the long rotary joint and the medium rotary joint are connected via a long straight connection tube, the medium rotary joint is connected to the short rotary joint via a short connector, the short rotary joint is connected to a sliding connection tube, wherein the deformation mechanism is disposed to be slidably connected to the main body of the coring device via the sliding connection tube, an end portion of the sliding connection tube is disposed with a stop ring for restricting disengagement of the sliding connection tube, wherein the medium rotary joint and short rotary joint are slidably connected to the pair of sliding plates at the same time, a first sliding groove and a second sliding groove staggered in upper and lower layers are provided within each of said sliding plates, the medium rotary joint slides along the first sliding groove and the short rotary joint slides along the second sliding groove.

2. The wire follow-up protection structure of the electric reducer as claimed in claim 1, wherein the long straight connection tube being is in plug connection with the medium rotary joint.

3. The wire follow-up protection structure of the electric reducer as claimed in claim 2, wherein: the long straight connection tube is in plug connection with the medium rotary joint via a male joint and a female joint.

4. The wire follow-up protection structure of the electric reducer as claimed in claim 1, further comprising a passage for hydraulic oil.

5. The wire follow-up protection structure of the electric reducer as claimed in claim 1, wherein: the material of the deformation mechanism is an anti-corrosion metal resistant to high temperature.

\* \* \* \* \*